United States Patent [19]

Rubin

[11] Patent Number: 5,155,842
[45] Date of Patent: Oct. 13, 1992

[54] LOGICAL EVENT NOTIFICATION METHOD AND APPARATUS

[75] Inventor: Darryl E. Rubin, Redmond, Wash.

[73] Assignee: Microsoft Corporation, Redmond, Wash.

[21] Appl. No.: 394,100

[22] Filed: Aug. 14, 1989

[51] Int. Cl.⁵ ............... G06F 11/30; G06F 11/32
[52] U.S. Cl. ............... 395/575; 364/DIG. 1; 371/66; 395/200; 395/750
[58] Field of Search ............ 364/264, 281, 281.3, 364/284.3, 273.4, 284.4; 371/66; 395/200, 575, 750

[56] References Cited

U.S. PATENT DOCUMENTS 4,823,345  4/1989  Daniel et al. ............... 371/37.1
4,847,749  7/1989  Collins et al. ............... 395/575

OTHER PUBLICATIONS

R. Jensen, "A formal approach for communication between logically isolated virtual machines", *IBM Systems Journal*, vol. 18, No. 1, 1979, pp. 71-92.
T. Sullivan, "Communicaitons Network Management enhancements for SNA networks: An overview", *IBM Systems Journal*, vol. 22, Nos. 1/2, 1983, pp. 129-142.
R. Weingarten et al., "Logical problem determination for SNA networks", *IBM Systems Journal*, vol. 22, No. 4, 1983, pp. 387-403.
L. Kored et al., "Improving availability of software subsystems through on-line error detection", *IBM Systems Journal*, vol. 25, No. 1, 1986, pp. 105-114.
R. Moore, "Utilizing the SNA Alert in the management of multivendor networks", *IBM Systems Journal*, vol. 27, No. 1, 1988, pp. 15-30.
M. Ahmadi et al., "NetView/PC", *IBM Systems Journal*, vol. 27, No. 1, 1988, pp. 32-44.
D. Kanyuh, "An integrated network management product", *IBM Systems Journal*, vol. 27, No. 1, 1988, pp. 45-59.
T. Routt, "SNA network management: What makes IBM's Netview tick?" *Data Communications*, Jun. 1988, pp. 203-227.
L. d'Arielli, "A message management system for personal computers", *IBM Systems Journal*, vol. 28, No. 3, 1989, pp. 479-493.

*Primary Examiner*—Stephen M. Baker
*Attorney, Agent, or Firm*—Seed and Berry

[57] ABSTRACT

A method and apparatus for notifying programs that a logical event has occurred on a network, said event being a power failure. Upon the occurrence of a logical event in an operating program, an alert report is generated and stored in a buffer. An alert function call occurs, providing the event type and a pointer to the buffer. The alert function call reads a look-up table listing the programs or users requesting notification of events. The look-up table provides the addresses to which notification should be sent and the type of notification requested. The alert subroutine sends the requested event data from the buffer to the listed addresses. The alert function is completed and the operating program resumes operation. Upon receiving the event report, the receiving program stores it, displays it to a user, generates additional reports, begins controlling network activities, or the like as directed by the receiving program. The invention provides the advantage that each operating program need only perform a universal function call to send event data through the network and then may return to a task. The operating program is not concerned with who receives the report or what action is taken based on the report. The programs requesting alert data from an operating program of any type need only provide a request to an alert look-up table. The sources of the events and requesting programs are all software controlled, providing ease in adding or modifying each.

15 Claims, 3 Drawing Sheets

LOGICAL EVENT NOTIFICATION METHOD AND APPARATUS

TECHNICAL FIELD

This invention is in the field of local area network (LAN) controllers and is more particularly directed toward notifying users and programs on the network of an event occurring on the network.

BACKGROUND OF THE INVENTION

LANs which provide a single, central file server for a plurality of users are well known in the art. According to the prior art, a central file server controls a plurality of devices and is controlled by a plurality of users according to many different programs. The central file server must run programs for controlling the print queue, loading data into the print queue, writing data to one or more disks, reading data from one or more disks, writing data to screens of individual users, and many other functions.

The central file server controls programs as directed by one or more users. While one user is running a particular program, another user may desire information about the program or devices controlled by the program. For example, while one user is printing a job, another user may desire to know the status of the printer and of any jobs in the print queue. Using the prior art, when a user desires to know the status of another program, such as a print controller, or of a device, such as a printer, the user is required to address the program or device and poll it for information. The device is then required to provide the information to the requesting user. If the status of the printer or print queue changes a moment later, the user desiring to know the status is not notified Rather, the user is required to poll the printer or printer queue again to determine current status. If a user desires to know information about any other program or device, he is required to individually poll the selected device. Frequently, the user is required to know the individual address, particular protocol, and data formatting scheme for the device and program to which the inquiry is directed.

A significant disadvantage of the prior art is that all requests about network status, program operation, and device information are user driven. Each user desiring information is required to generate the signals requesting information. The programs providing information are required to interrupt their processing to provide the requested information to the user on demand. For a complex network, a user may be required to recall many different codes and protocols for addressing numerous individual devices and programs within the network. The result is that many users are unaware of the status of numerous devices and programs operating on the network. User confusion and frustration result from the lack of information. The network is slowed down if many users communicate with a program while it is running.

SUMMARY OF THE INVENTION

It is therefore an object of this invention to provide a method of automatically alerting users and programs about logical events occurring while programs are running on a network.

It is another object of this invention to provide an apparatus for monitoring logical events on a network and notifying programs desiring information on specified types of events.

These, and other objects of the invention, are accomplished by providing an alert function call and an alert database on the network. Upon occurrence of a logical event in an operating program or device, an alert function call is called by the respective program. The alert function call creates a buffer from the memory allocated for the operating program. Data describing the event are formatted and stored in the created buffer as an alert report. The source program notifies an alert database that a logical event has occurred and that an alert report describing the event is stored in a particular buffer. The alert database contains a look-up table of the addresses of all programs desiring to receive events, specified by event type. The alert software steps through the look-up table and writes a copy of the requested alert report data to all requesting programs. After the alert database has stepped through the look-up table, the operating program disassembles the buffer and continues its operation.

The receiving programs take action upon receiving an alert report. For example, one receiving program may notify the user that his own print job is completed. Another receiving program may notify a particular user or administrator as every print job is completed. The receiving program may also take action based on the event. For example, the receiving program may automatically control ordering paper and may place an order for additional paper based on the number of pages printed over a specified period. The receiving program may automatically store program data in a memory in anticipation of the event causing the network to go down.

An advantage of the invention is that each source program of a logical event merely performs a function call to alert all users of the occurrence of the event. After sending the event data to specified address, a rapid operation, the operating program continues operation. Interaction with another program is not required. Any user desiring to be notified of a logical event on the network merely provides the event types of which he wishes notification to the alert database and the address to which he wishes the data sent. Once received at the address, the user decides what to do with the data. The user may select to store the data in memory, print it to the screen, produce a report, log in event occurrences over time, or the like.

A further advantage of the invention is that the event triggering the notification in the operating program is software defined. If users of the system determine, after several months of operation, that occurrence of an event is important, a function call to the alert database for execution upon the occurrence of the event is inserted into the operating program responsible for producing the event. The new event type is defined, both for the operating program and the user. Any user desiring to receive this event type provides a receiving address to the alert database. Similarly, each user defines the action to be taken when data is received and can modify the action as desired.

DETAILED DESCRIPTION OF THE INVENTION

Figure 1:
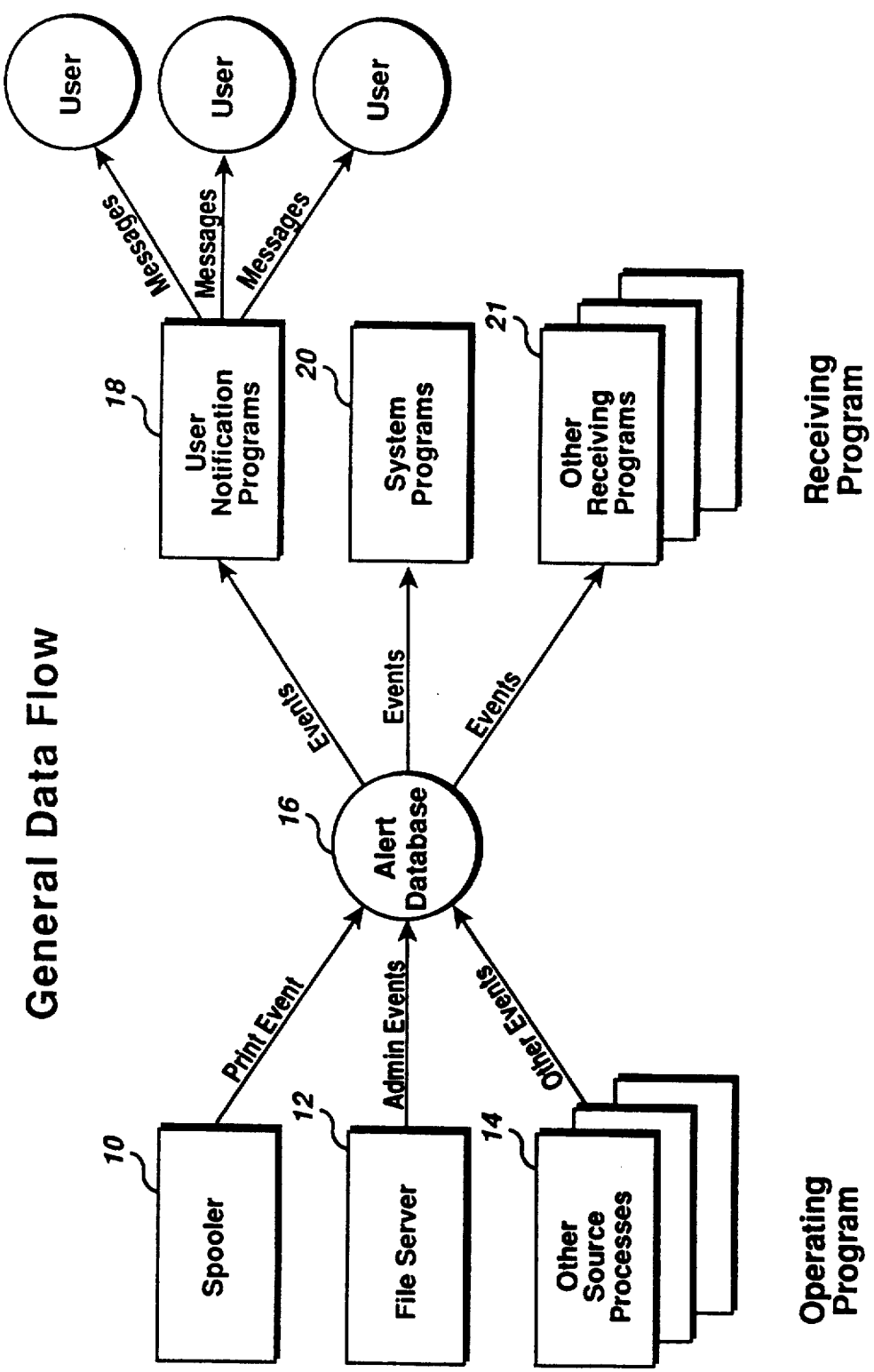
FIG. 1 is a schematic of a logical event notification flow from an operating program, through the alert database to a receiving program.

FIG. 1 illustrates the general data flow from an operating program, through the alert database to a receiving program. An operating program 10, 12, or 14 on the network performs functions for controlling devices or is controlled by devices or the network. The operating program is the source of the event; it may be referred to as the source program. As programs operate on the network, logical events occur. When the occurring event is one that is important to the users, a function call to the alert database 16 immediately occurs after the event, as the next step in the operating program. The function call has been previously inserted by users or a system administrator. The operating program performs the alert database function call. Control is not transferred to a different program; rather, the operating program that is the source of the event retains control of the computer processor.

The alert database function call transfers a notification of the event to all programs requesting notification of such an event. The alert database 16 includes a look-up table listing of event types. For each event type, an address is provided for receiving the notification. The type of notification requested is also listed. Some programs request only a summary of the event; others request a detailed report. The type of notification requested is sent to the addresses listed in the look-up table.

The addresses in the look-up table are entry points into receiving programs 18, 20 and 21. The receiving programs 18, 20 and 21 contain instructions for performing functions based upon the event data. If the receiving program is a user notification program 18, users are notified of the event in the manner they request. Some users receive a mail message in their mailbox describing the event. For other users, the event description is printed. For still other users, the event description is printed on the screen immediately. The type of notification received by each user is controlled by the user. If a user desires to change the type of notification he receives, he may easily modify the notification scheme. However, the type of notification provided to the user does not alter the operating program, the function call or alert database. Decoding the event description and notification to the user are selected by the individual user.

Figure 2:
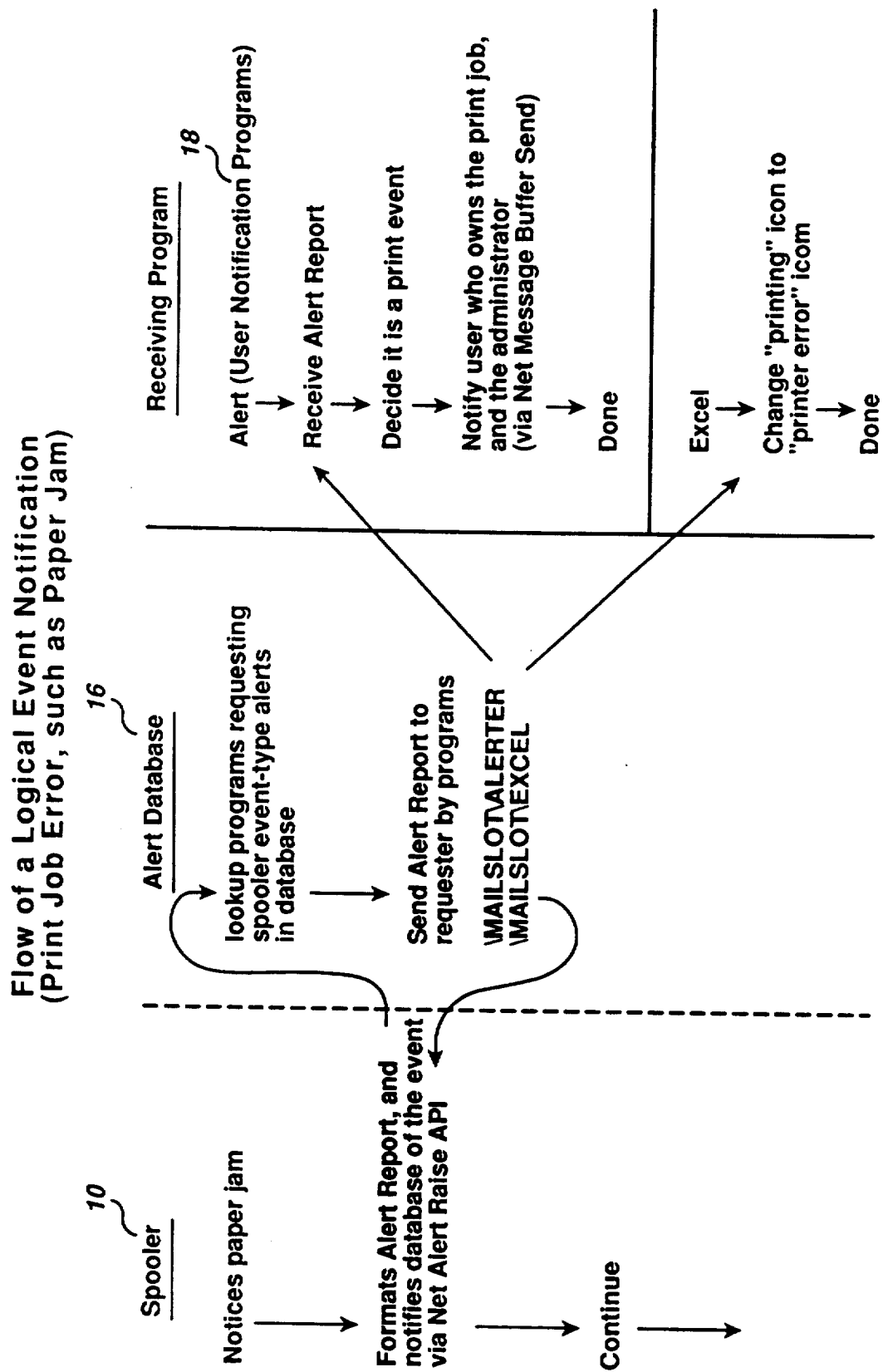
FIG. 2 is a description of the flow of a single logical event from a spooler program to a receiving program.

Other programs 20 and 21 receive notification of the event. A system administrator receives reports for system program 20 of numerous event types, providing him with the status of the operation of the system. Other receiving programs 21 may store the event or take action based on the event type FIG. 2 illustrates the flow of one particular type of a logical notification event as an example. While the logical event illustrated is a print job error, such as a print jam, any logical event follows the same sequence. A spooler program, while operating a printer, notices a print jam in a particular printer. A print jam has previously been selected as a logical event requiring notification. The spooler program becomes the source program for that particular event and executes the alert database function call. The spooler program formats a description of the event into an alert report. The alert report lists the event type, a printer event; the time of the event; the source of the event, the spooler program; and information describing the printer event as a paper jam on a particular printer. The alert report is stored in a buffer created by the spooler program. The spooler program notifies the alert database via the Net Alert Raise Application Program Interface ("API") function call.

The function call of the alert database steps through a look-up table of addresses requesting notification events by event types. All addresses that have requested to receive printer events are sent data describing the event. A full copy of the alert report is sent or, alternatively, a summary of the data in the alert report is sent. The copy is sent to the mail slot of an alerter program 18 or the mail slot of an Excel TM program 21. To increase the speed of operation, the look-up table may be presorted by global event type. The function may quickly enter the event type address array and need not check each address. Upon sending a copy of the alert report in the buffer to the requested addresses, the function call ends and returns to the next step in the spooler program. The spooler program continues operation.

The receiving program receives the alert report at the address provided to the alert database. The receiving program decodes the event type as a print event. The receiving program further decodes the event as a printer error. If the receiving program has requested detailed information of all printer errors, the receiving program continues to decode the message to determine the type of printer error (printer jam, in this example), the specific printer experiencing the error, and the queue to which the printer is attached. Most users, not desiring detailed information on all printer alerts, may receive nothing or receive only a summary of the alert report, that a printer error has occurred, and not receive the rest of the signal. Alternatively, a user may receive the full alert report, decode the user, and then decode the rest only if he is the user. Generally, a user will desire to have all print jobs for which he is listed as the user fully decoded and displayed immediately on the screen. The program for the individual user therefore notifies the user who owns the print job that a paper jam has occurred. The administrator is also notified of the paper jam so that appropriate action may be taken.

In one embodiment, an alert signal is sent to the alert database to provide the notification that a logical event has occurred and that an alert report is stored in a buffer. The alert signal includes a pointer to the buffer storing the alert report. The alert database then copies the alert report from the address of the pointer to the addresses requesting the alert report. Sending an alert signal having a pointer differs from the embodiment performing the function call to the alert database. In the function call embodiment, the operating program steps through the look-up table and copies and sends the alert report as steps in the function call, but in the alert signal embodiment the alert database software copies and sends the alert report. Either embodiment may be used to carry out the invention and portions of either may be intermixed into a new embodiment if desired.

Any program operating on the network may become a source program. For example, in one embodiment, a backup battery is provided to power the network for a specified period of time, such as for 20 minutes, in the event power is lost. A power watch program monitors the status of power input to the network. If power is interrupted to the network, the power watch program notices the logical event, power failure, creates an alert report and stores the report in a buffer it allocates. The power watch program is the source program. The source program notifies the alert database of the alert report. The alert database steps through the look-up table and sends the alert report to all requesters desiring information of that type of event, a power failure. Generally, all users will request to receive information of a power failure. The users are notified that the system is operating on backup battery power and that a limited time remains for them to complete their current tasks. A computer shutdown program 21 will also receive the alert report. When the shutdown program 21 receives an alert report that there is a power failure, the shutdown program begins to take action based on the event. The shutdown program begins to close files which are open, move data from volatile RAM memory to disk storage, and perform other functions necessary to provide smooth shutdown of the system. The program prepares the network to retain all programs and data intact upon depletion of the battery power.

In one embodiment of the invention, the system administrator is automatically alerted whenever the quantity of data on the disk exceeds a threshold amount. The administrator may then take action to conserve disk space or delete programs. The program may automatically delete the oldest versions of some programs to obtain more disk space. The program may send mail to users using significant disk space and ask them to clean-up . their databases and remove unnecessary data.

A significant advantage of the present system is that the event types and source programs do not need to be built into the system. The logical events are selectable by software code. New programs can be added at any time to define new events or control additional functions. If a user desires to receive notification of an event, he does so by providing an address to the alert database look-up table for the event type he is interested in receiving. The alert database steps through the look-up table looking for requesting addresses by event type. If a user does not wish to receive an alert report for certain types of data, he does not provide an address for that particular event type. As new event types are created by the system administrator, a user may elect to receive alert reports of that event type. The receiving program turns the alert report into usable reader messages and sends copies to the user.

An advantage in speed and simplicity of operation is that the source program and receiving program are not connected to each other during the alert database function call. Rather, the operating program that raised the event also created the alert report and sent the alert report to addresses based on a look-up table. Upon sending the program to the requested addresses in the look-up table, the source program's job is completed and it returns to the task at hand.

Notification of all events for all users goes through the alert function call, significantly simplifying notification for many types of events. A separate, customized user notification scheme for each device is not required The alert report need only be sent to the "Grand Central Station" of the alert database 16 and then it is appropriately rerouted from there based on addresses listed in the look-up table. For example, one address to which the alert report may be sent from the alert database is an Excel TM database. The Excel TM database may change a printing graphics signal ("icon") to a printing error icon to notify the user of the printer error. The operating program is not concerned with which or how many programs receive the alert report. The receiving program need only send the request for an alert report into the single, Grand Central Station and it receives a copy as it is rerouted as directed there.

Sending a data string to a listed address in memory is a rapid, yet simple process. No computation, polling or interruption of another process is involved The data is sent, one-way, and the job is completed. The computer time required is significantly less than if a user were to poll the program to ask for a status report of an event. If many users are asking for event data, the network slows down and network operation becomes complex. If, as the invention teaches, users receive notification of events as they occur, smooth and efficient operation results. The user need only set up an address to receive each type of event of interest to him and, as the event occurs, he is notified.

Figure 3:
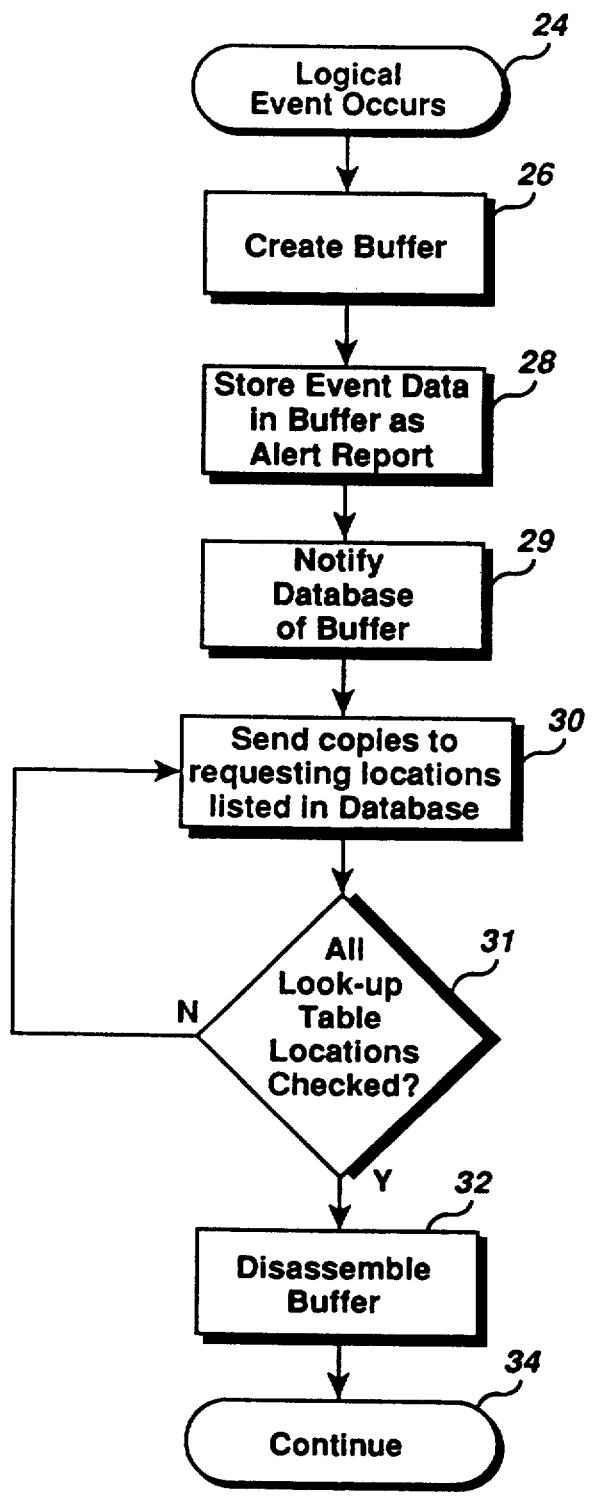
FIG. 3 is a flow chart of the alert database a logical event function call.

FIG. 3 is a detailed flow chart of the source program performing the function call to send an alert report. As the program operates, a logical event occurs, 24. Upon the occurrence of a logical event, the alert database function call is entered. The source program creates a buffer 26 from the memory space allocated for its own operation. The source program then stores event data in the created buffer and formats it as an alert report 28. The source program notifies the database of the buffer 29. The database steps through the look-up table searching for requests for this event type. A copy is sent to all addresses requesting data of the event type received 30. After the report has been sent to all addresses requesting this event type 31, the buffer is disassembled 32 and the source program continues operation 34.

An alert report is formatted having the following data: "event type," "date and time," "source of event," and "information." The "event type" specifies the type of event which has occurred. Event types may include, as a broad category, printer errors. Alternatively, the event type may provide information of the type of printer error, such as "paper jam," "out of paper," "print queue full," or the like. Other event types include system disk events, such as, "disk full," "disk approaching a threshold full level," "disk error," "failure in reading disk," "failure to write data to disk," or the like. Other event types include "user logged on," "power failure," "central controller error," "error writing to RAM," or the like.

The "date and time" specifies the date and time of the occurrence of the logical event. The "source of the event" specifies the operating program that is the source program. The source program may be a printer control program, a disk control program, or the like.

The "information" is detailed data provided of the event. The "information" data within each alert report will be different, based on the event type. For an event type of a printer error, the "information" will likely include such features as the job ID, the status of the job, the size of the job, the submission time, the user name, the queue name, the printer destination, a status string containing specific information about the print error, and the like. Alternatively, the "information" may include a summary of the alert report and then provide an address where a more complete report has been stored. The receiving program may direct that the "information" be stored, addressed to a mail slot, printed, or the like.

A user may desire to receive only a summary version of an alert report. A summary version of the alert report may include only the event type. The event type is thus transferred to programs requesting the event type only, while more detailed information is sent to programs requesting the complete alert report. Generally, a user will desire to receive complete information on all event types for which his name occurs as the user name. His user program at the receiving address contains the directions to examine the alert report to determine if it is of interest to him. The source program is not concerned about each individual user's interest in the data but merely sends the requested data to the listed address and returns to work. The invention thus provides for fast notification to users and then continued operation.

Frequently, a user or a program is not interested in receiving notification of many event types, particularly the event types which do not concern him. A user will therefore not provide an address in the look-up table for event types which are of no interest to him. For example, a user not desiring system information or the status of hard disk storage would not provide a receiving address for alert reports of these event types. Generally, the network administrator desires to receive notification of each event type. The system administrator therefore provides an address for each logical event which will occur during operation of the network. The address provided for each event type may be different. The program receiving each different event type decodes it and takes appropriate action. The program therefore takes steps based on the event type received.

While a specific embodiment of the invention has been described in this application, any equivalent function or device operating according to the principals of the invention fall within the scope thereof.

I claim:

1. A method of monitoring events occurring on a computer network having a plurality of users and a plurality of devices coupled to said network, comprising:
   performing a process under the control of an operating program;
   entering an alert database function call from the operating program when the program causes or notices a logical event occurring on said network, said event being a power failure;
   generating an alert report describing said event;
   storing said alert report in a buffer; and
   writing a copy of said alert report to a plurality of addresses, one of said addresses being a receiving program that notifies all users that the power has failed and that the system is on battery power, and another of said addresses being a receiving program that begins controlling network activities to provide an orderly shutdown procedure.

2. The method according to claim 1 wherein said writing step further includes:
   creating a look-up table having said address and an event type of data for sending to said address;
   posting an alert request in a look-up table, said alert request indicating for which events a report is to be sent to said address;
   reading said look-up table; and
   writing said alert report to those programs having an alert request for said type of event in said look-up table.

3. The method according to claim 1 wherein said alert report is stored by one of said programs receiving said alert report.

4. The method according to claim 1 wherein said alert report is stored in a buffer and an alert signal is generated that describes said event type and includes a pointer to said buffer.

5. The method according to claim 1 wherein said buffer is created from the operating memory allocated for said operating program.

6. The method according to claim 1 wherein said alert report includes data listing the event by event type.

7. The method according to claim 6 wherein said alert report further includes data describing the event type, the date and time of said event, and the program operating when said event occurred that entered said function call.

8. An apparatus for monitoring a power failure on a network, comprising:
   a plurality of operating programs on said network;
   alert report generating means for generating data describing an event, at least one of said events being a power failure;
   a buffer for storing said alert report;
   alert signal generation means for generating an alert signal when said event is a power failure occurring on said network;
   a central alert controller for receiving said alert signal;
   an alert database having alert requests from receiving programs indicating for which type of notification is requested by said receiving program and the address to which said alert report is to be written; and
   transferring means for transferring said alert report to said receiving programs for which an alert request is present in said alert database for said event being a power failure, one of said receiving programs notifying all users that the power has failed and that the system is on battery power, and another of said receiving programs controlling network activities for an orderly shutdown procedure.

9. The apparatus according to claim 8 wherein one of said operating programs controls a printer and one of said events is a printer error.

10. The apparatus according to claim 8 wherein one of said operating programs controls a disk and one of said events is a disk error.

11. The apparatus according to claim 8 wherein one of said events is that the disk has exceeded a threshold full capacity indicating that the disk is approaching full capacity.

12. The apparatus according to claim 8 wherein said operating program is a power supply monitor and said event is an interruption of power to said network.

13. The apparatus according to claim 8 wherein a said alert report is stored in a buffer allocated by said operating program from its own memory availability.

14. The apparatus according to claim 8 wherein said receiving program causes said alert report to be displayed to a user.

15. The apparatus according to claim 8 wherein said receiving program causes said alert report to be stored in memory and notifies said user that an event report has been stored in memory.

* * * * *